Jan. 21, 1941.  F. M. PARKS  2,229,220
COOLING UNIT FOR PRODUCE HAULING
Filed June 15, 1940
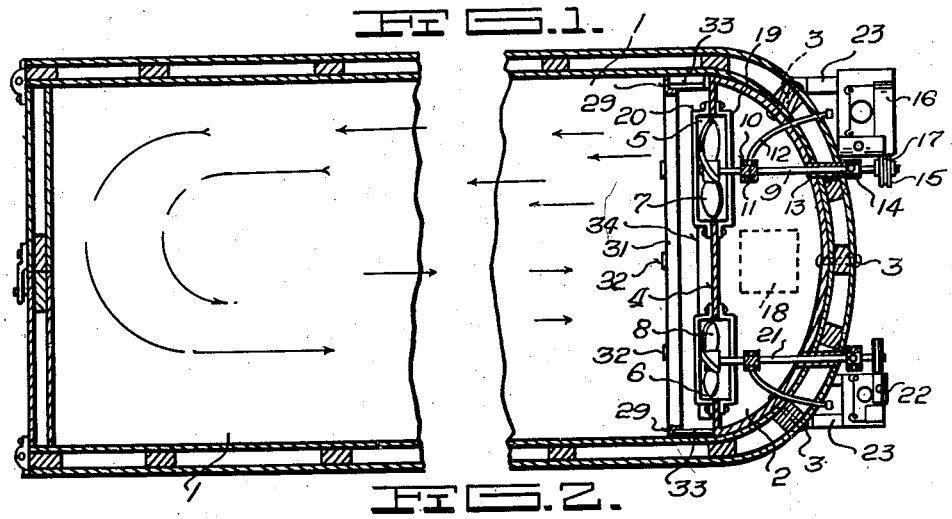
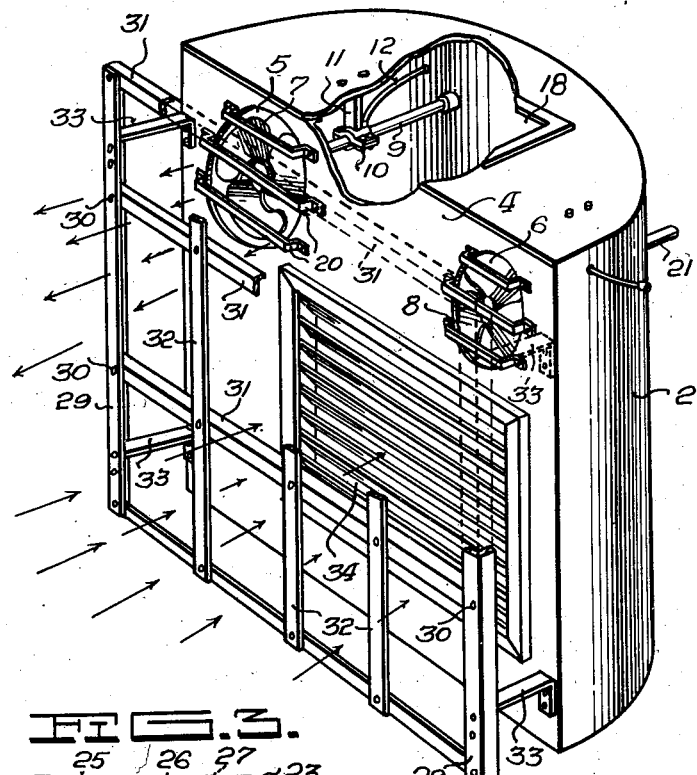
Fred M. Parks
INVENTOR.
ATTORNEY.

Patented Jan. 21, 1941

2,229,220

UNITED STATES PATENT OFFICE 2,229,220

COOLING UNIT FOR PRODUCE HAULING

Fred M. Parks, Dallas, Tex.

Application June 15, 1940, Serial No. 340,744

3 Claims. (Cl. 62—24)

This invention relates to cooling units and more particularly to apparatus for cooling and setting up artificial air circulation in produce trucks and trailers.

The principal object of the invention is to provide a structure including a water ice bunker, wherein all of the elements of the combination are so associated that the apparatus may be built and quickly and inexpensively installed in a truck or trailer as a unit and as effectively removed therefrom.

Another object of the invention is to conserve valuable storage space in a truck or trailer in order that a load of merchandise may be as profitable as possible, by utilizing only a comparatively small space in one end of the vehicle body.

Another object of the invention is to provide a guard frame disposed forwardly of the unit which serves the dual purpose of protecting the exposed face of the unit against damage resulting possibly by produce crates and other objects striking the same, as well as holding the cargo a spaced distance from the front of the unit to insure free circulation of air through the unit and the body in which it is installed.

Still another object of the invention is to afford a cooling unit for long distance hauling of perishable merchandise, especially through arid or torrid zones, in which is provided a means as well as an auxiliary means for producing forced circulation of air in the event of failure of one to perform, as a precaution against spoiling of the commodity should for any reason the vehicle stall for any great length of time without available refrigerating facilities.

Yet another object of the invention is to provide an improved motor mounting which will support the motor at any desired distance from the circulating fan shaft pulley, in order that drive belts of any length may be employed, where it is not possible to obtain one of a given size.

With the foregoing objects as paramount, the invention has particular reference to its salient features of construction and arrangement of parts which will become manifest as the description proceeds, taken in connection with the accompanying drawing, wherein:

Figure 1 is a plan view in longitudinal section of a trailer body showing the invention arranged therein.

Figure 2 is a perspective view of the invention with portions of the guard frame and ice bunker broken away, and Figure 3 is a detail view of one of the motor mountings.

Continuing with a more detailed description of the drawing, reference is primarily made to Figure 1 in which 1 denotes a truck trailer body. Practically all transport truck trailers are constructed with rounded or "stream-lined" ends, as shown. The forward end of such a trailer provides a desirable location for the cooling unit of this invention and being thus situated it occupies a comparatively small part of the valuable storage space, is effective in maintaining low and uniform temperature throughout the load and requires no conduits or space in other parts of the body to perform the required functions.

The ice bunker 2 is of substantially plano-convex shape in transverse section, although the object is to so shape the curved side as to conform to the inner wall surface of the trailer end, as shown. The bunker is first constructed and then installed and secured in position by bolts 3.

The front wall 4 of the bunker is provided with two openings 5 and 6, the former being the largest as it accommodates the fan 7 which is the principal one, the fan 8 being merely an auxiliary means for maintaining forced circulation in the event the fan 7 fails to function for any reason.

Fan 7 is mounted on a shaft 9, suspended intermediate its ends by a bearing 10, the latter being carried by a depending member 11, secured to the underside of the top of the bunker 2. This bearing is kept lubricated by passing lubricant through a conduit 12, extending through the wall of the body 1. The shaft 9 continues through a bushing 13 in the trailer wall and is journaled in an exterior bearing 14, mounted on the outer wall surface, and carries a grooved pulley 15 on its outer end. A small motor 16, preferably of the internal combustion type, drives shaft 9 through a belt 17.

The fan 7 is protected on the inside of the bunker from damage by ice dropped through the opening 18 by a guard 19 and on the outside by a similar guard 20.

The combination or auxiliary fan 8 is identically mounted and operated, it being carried on a shaft 21 and driven by a motor 22, preferably of much smaller dimensions than those of motor 16.

Each of the motors 16 and 22 are mounted on supports 23, an example of construction being shown in Figure 3. Each support is comprised of brackets 24, across the horizontal portions of which is secured relatively parallel bars 25. The motor base 26, shown in dotted lines in Figure 3 has bolts 27, disposed against the outside edges of bars 25 and passing through apertures in the ends of bars 28, relatively parallel but in transverse relation to bars 25. In this manner, the nuts of bolts 27 may be loosened, the motor base 26 adjusted to the desired position to tighten the belt and again secured.

The means for protecting the front of the bunker 2 is comprised of uprights 29, preferably of angle iron, to which is secured by bolts or welds 30, horizontal members 31. These members are intercrossed by vertical members 32. The frame thus constructed is connected to and spaced forwardly from the bunker by brackets 33.

In operation, the bunker 2 is charged with ice or other refrigerant through the opening 18. The motor 16 is set into operation to cause the fan 7 to propel air toward the rear of the trailer body. Recirculation takes place through the louvered opening 34 and the bunker 2. The air, in being circulated through and across the merchandise in the trailer, rises in temperature, which is again reduced in its forced travel across the ice in the bunker. As stated, should the motor 16 fail to function for any reason, leaving the cargo in a precarious situation, motor 22 is operated to actuate fan 8 to produce identical results until the companion motor has been again set into operation.

Manifestly, the construction as shown and described is capable of some modification and such modification as may be construed to fall within the scope and meaning of the appended claims is also considered to be within the spirit and intent of the invention.

What is claimed is:

1. An air cooling and circulating unit comprising an ice bunker, a portion of which is constructed to conform with the inner end wall of a truck trailer, the wall of said bunker opposite the conforming portion being provided with relatively spaced openings, fans disposed in said openings, independently operated means for actuating said fans, a louvered air return opening below said fan openings and a protective frame joined to and spaced from the forward wall of said bunker.

2. An air cooling and recirculating unit comprising an ice bunker, a portion of which is shaped to conform to the inner end wall of a produce truck trailer, fans disposed in openings in the wall of said bunker opposite said conforming wall for propelling air toward the opposite wall of said trailer, a louvered opening in said latter wall to receive air for recirculation, separate means for driving said fans and means secured to the front wall of said bunker to hold the trailer contents in spaced relation to said wall to insure free circulation of air.

3. An air cooling and recirculating unit comprising an ice bunker having a filler opening in its top, spaced fan openings in one wall thereof and a louvered air return opening therebelow, independent means for operating said fans and means connected to and spaced forwardly of the openings in said bunker wall to shield said openings for free exchange of air.

FRED M. PARKS.